(12) United States Patent
Chu

(10) Patent No.: US 8,313,273 B2
(45) Date of Patent: Nov. 20, 2012

(54) HOOK ASSEMBLY

(75) Inventor: Chung-Jun Chu, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/175,962

(22) Filed: Jul. 5, 2011

(65) Prior Publication Data

US 2012/0228450 A1   Sep. 13, 2012

(30) Foreign Application Priority Data

Mar. 10, 2011   (CN) .................. 2011 2 0061912 U

(51) Int. Cl.
*F16B 21/00* (2006.01)

(52) U.S. Cl. ............. 411/340; 411/344; 248/231.9; 248/304; 248/308

(58) Field of Classification Search ............ 248/231.9, 248/231.91, 301, 304, 308, 691; 411/340, 411/344
See application file for complete search history.

(56) References Cited

U.S. PATENT DOCUMENTS

| | | | | | |
|---|---|---|---|---|---|
| 3,487,746 | A | * | 1/1970 | Kapnek | 411/37 |
| 4,274,324 | A | * | 6/1981 | Giannuzzi | 411/38 |
| 4,712,956 | A | * | 12/1987 | Bond et al. | 411/55 |
| 4,878,790 | A | * | 11/1989 | McSherry et al. | 411/34 |
| 5,308,204 | A | * | 5/1994 | Moen | 411/37 |

* cited by examiner

*Primary Examiner* — Gwendolyn Baxter
(74) *Attorney, Agent, or Firm* — Altis Law Group, Inc.

(57) ABSTRACT

A hook assembly comprises a body, a securing portion, a hanging portion, a connection portion and a pair of arc-shaped wings. The securing portion and the hanging portion are respectively extending from two opposite sides of the body. The securing portion comprises an extending portion and a hook portion parallel with the body. The extending portion is extending between the body and the hook portion. The connection portion is extending from the body, the wings are respectively extending from two opposite sides of the connection portion. Junction portions between the connection portion and the body and between the wings and the connection portion are cut, and the connection portion and the pair of the wings are respectively folded along corresponding junction portions resulting in the connection portion with the pair of wings together defining a receiving space to receive the body and the securing portion.

7 Claims, 5 Drawing Sheets

HOOK ASSEMBLY

BACKGROUND

1. Technical Field

The disclosure generally relates to hook assemblies, and more particularly to a hook assembly attached to a wall.

2. Description of Related Art

Some ornamental objects, such as picture frames, mirrors, are generally hung on a wall using an expansion bolt. The expansion bolt usually comprises an expansion frame and a fixing screw matched with each other. To hang the objects on the wall, the expansion frame must be destroyed by screwing the fixing screw with a special tool so as to be embedded in the wall, which leads to inconvenience. In addition, the expansion bolt is hard to be removed from the wall, and cannot be used repeatedly.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
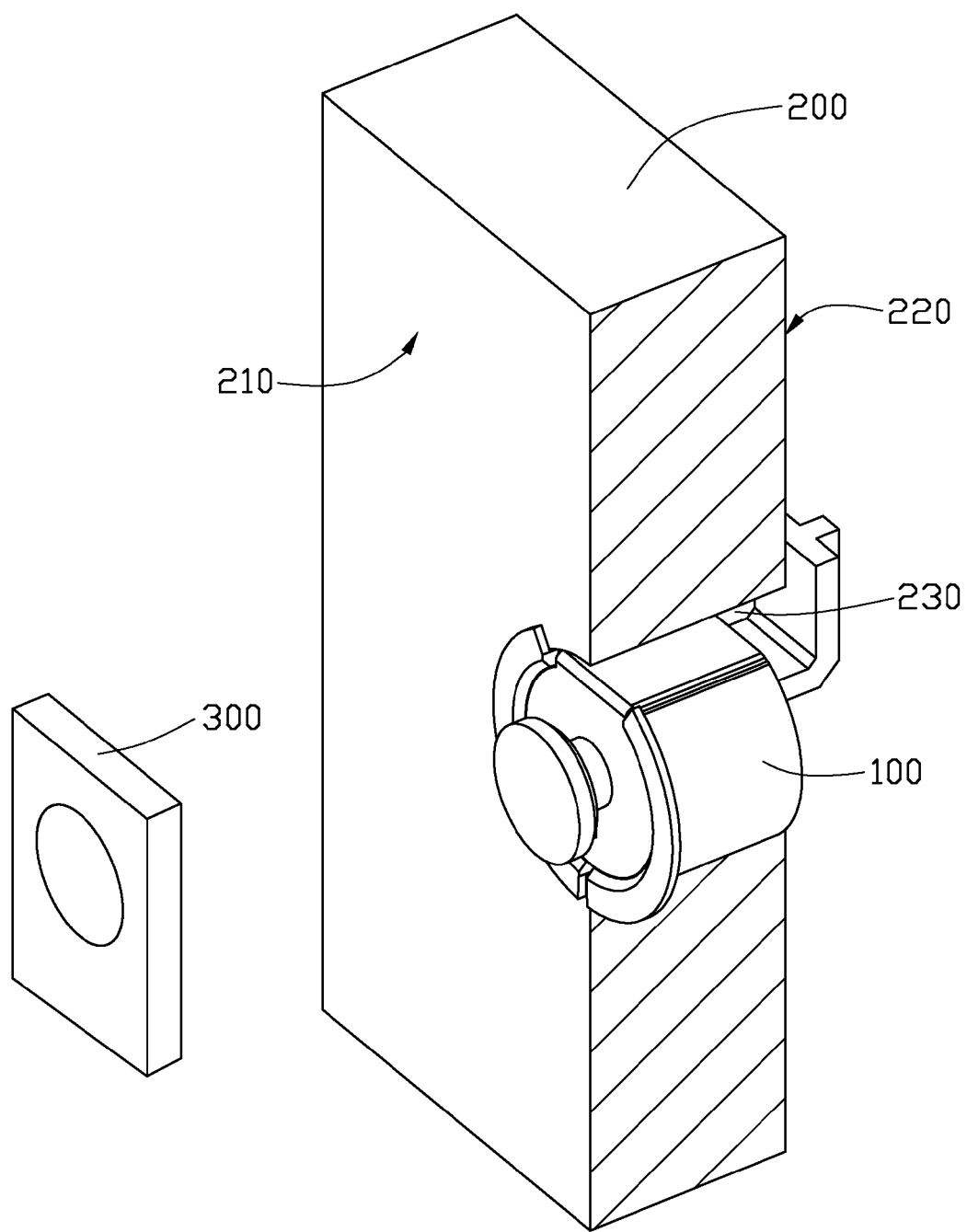
FIG. 1 is a perspective, isometric view of a hook assembly in accordance with an exemplary embodiment of the disclosure, in which the hook assembly is mounted in a wall.

FIG. 1 is a perspective, isometric view of a hook assembly 100 in accordance with an exemplary embodiment of the disclosure. The hook assembly 100 is mounted to a wall 200 to secure an object 300 onto the wall 200. The wall 200 comprises a first side 210 and a second side 220 opposite to the first side 210. The wall defines a through hole 230 that runs through the wall 200 from the first side 210 to the second side 220. The through hole can be created though a drilling process, for example. The hook assembly 100 is inserted into the through hole 230 to be fixed in the wall 200. The object 300 is attached to the hook assembly 100 to be hung on the wall 200. In the embodiment, the hook assembly 100 is integrally made of plastic material, but the disclosure is not limited thereto.

Figure 2:
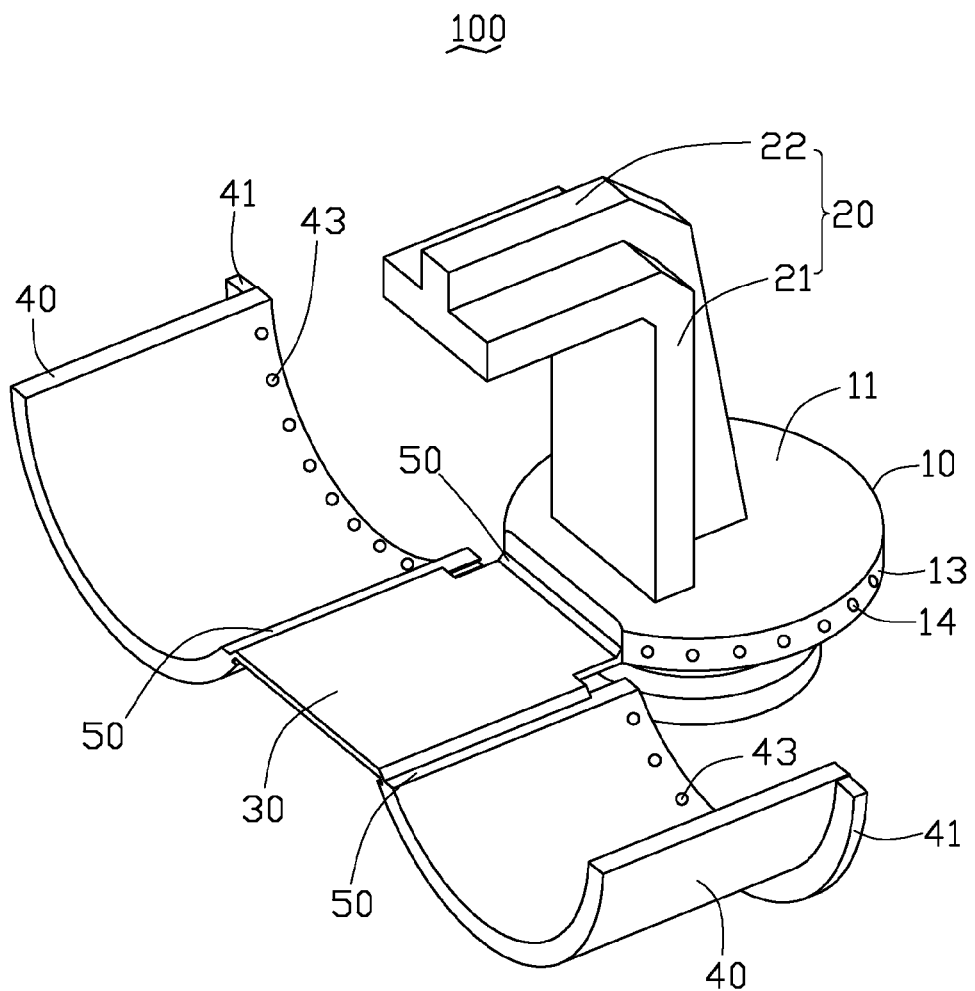
FIG. 2 is a disassembled perspective view of the hook assembly of FIG. 1.
Figure 3:
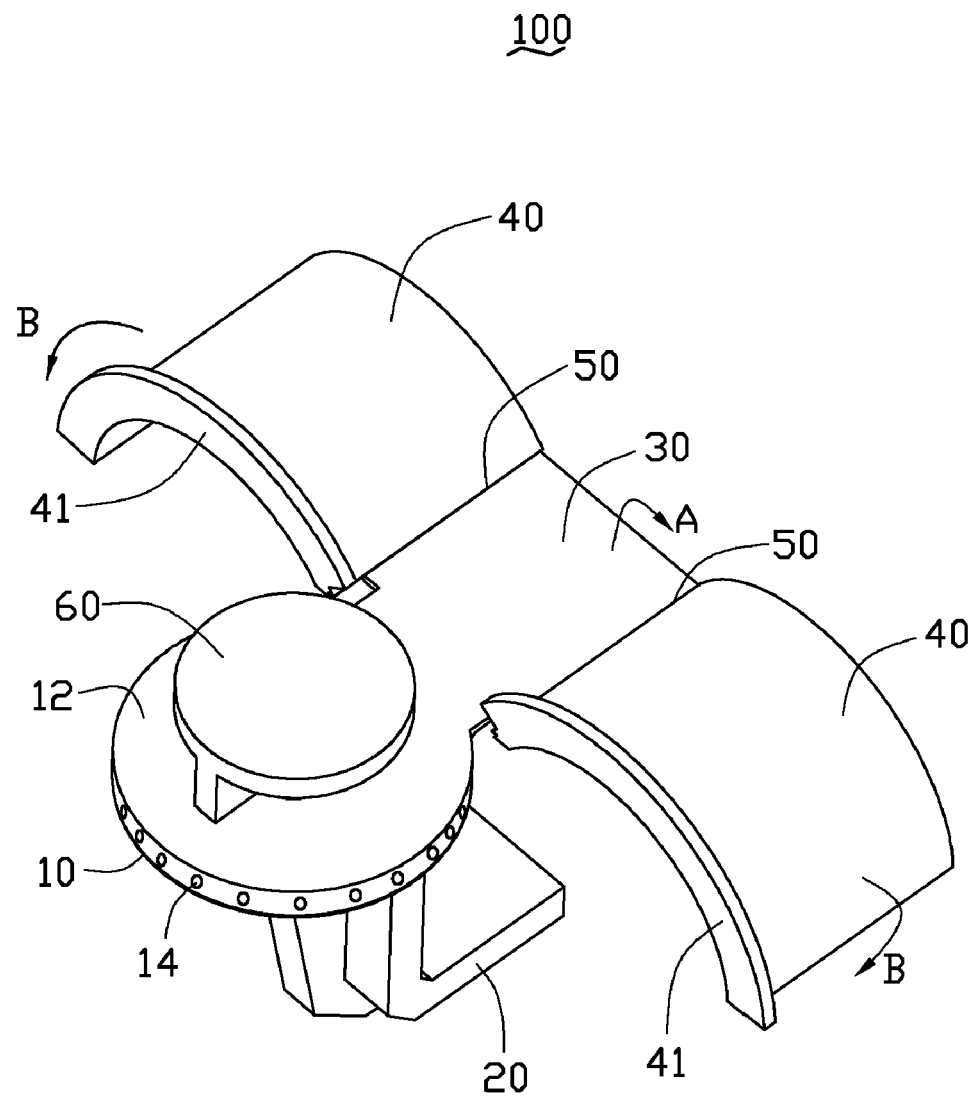
FIG. 3 is another view of the hook assembly of FIG. 2.

With reference to FIGS. 2-3, the hook assembly 100 comprises a body 10, a securing portion 20, a hanging portion 60, a connection portion 30 and a pair of arc-shaped wings 40. The body 10 comprises a first surface 11, a second surface 12 opposite to the first surface 11, and a peripheral surface 13 connecting edges of the first surface 11 and the second surface 12. In the embodiment, the body 10 is substantially in a shape of a frustum of a cone. That is, a perimeter of the first surface 11 is substantially smaller than that of the second surface 12. The securing portion 20 comprises an extending portion 21 extending from the first surface 11 of the body 10, and a hook portion 22 perpendicularly extending from the extending portion 21 and substantially parallel to the body 10. The hanging portion 60 protrudes out from the second surface 12 of the body 10 to hang the object 300.

The connection portion 30 extends from the peripheral surface 13 of the body 10. The pair of arc-shaped wings 40 respectively extends from two opposite sides of the connection portion 30. In the embodiment, the connection portion 30 is foldable relatively to the body 10, and the pair of wings 40 is foldable relatively to the connection portion 30. In detail, junction portions 50 between the connection portion 30 and the body 10 and between the wings 40 and the connection portion 30 are cut so as to improve flexibility of the junction portions 50. In assembly, the pair of wings 40 are folded toward each other along the junction portions 50 to collectively define a receiving space 70 to enclose the body 10 and the securing portion 20, and the connection portion 30 is bent relative to the body 10 so that the body 10 blocks the receiving space 70.

In the embodiment, each wing 40 comprises a stopper portion 41 located on one end of the wing 40 adjacent to the body 10. In assembly, the hook assembly 100 is received in the through hole 230 in the wall 200 with the stopper portion 41 abutting against one side of the wall 200.

In the embodiment, the peripheral surface 13 of the body 10 comprises a plurality of projections 14 protruding out from the peripheral surface 13, and the wings 40 defines a plurality of recesses 43 corresponding to the plurality of projections 14. In assembly, the projections 14 are respectively received in the recesses 43 to secure the body 10 of the hook assembly 100 in the receiving space 70 firmly.

Figure 4:
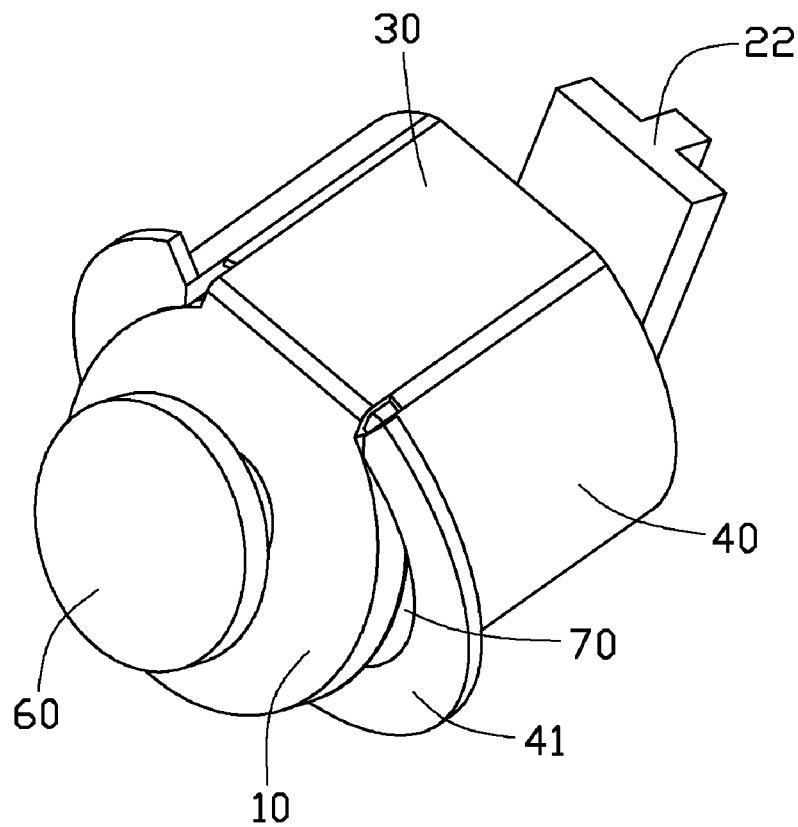
FIG. 4 is a perspective view of the hook assembly of FIG. 2, showing a connection portion and a pair of arc-shaped wings being respectively folded along junction portions to form the hook assembly.
Figure 5:
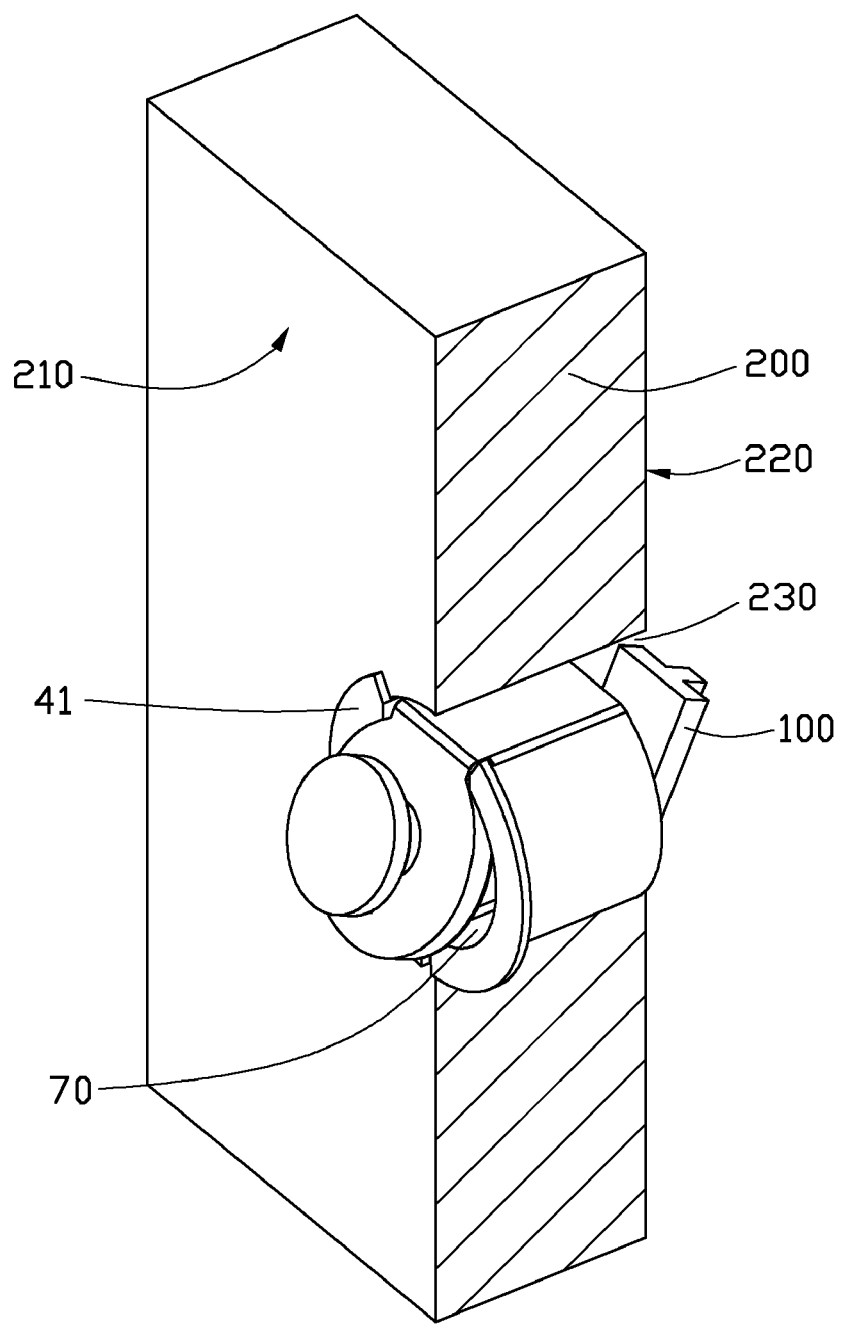
FIG. 5 is a perspective, isometric view of the hook assembly of FIG. 4, in which the hook assembly is inserted in the wall.

Referring to FIG. 4, during assembly the hook assembly 100, the connection portion 30 is bent relatively to the body 10 along the junction portion 50 between the connection portion 30 and the body 10, and the pair of wings 40 are folded toward each other along the junction portions 50 between the wings 40 and the connection portion 30 to collectively define the receiving space 70 to enclose the body 10 and the securing portion 20. In detail, the connection portion 30 is bent toward a first direction A relative to the body 10 along the junction portion 50 between the connection portion 30 and the body 10, and the pair of wings 40 are bent toward a second direction B relatively to the junction portion 50 between the wings 40 and the connection portion 30, as shown in FIG. 3. Subsequently, the bent hook assembly 100 is inserted into the through hole 230 from the first side 210 of the wall 230, as showing FIG. 5. Finally, the body 10 is fully received in the receiving space 70 by an external force on the body 10, which results in the body 10 compelling the pair of wings 40 to resist an inner wall of the through hole 230, and the hook portion 22 drawing the second side 220 of the wall 200, as showing FIG. 1. By this way, the hook assembly 100 is fixed in the wall 200.

The hook assembly 100 of the disclosure is made integrally, which leads to reduction of quantity of installing parts and low cost. Furthermore, the hook assembly 100 is secured in the wall 200 just by hand, without any special tool, which leads to convenience and saving installing time during hanging the object 300 on the wall 200.

While the exemplary embodiments have been described, it should be understood that it has been presented by way of example only and not by way of limitation. The breadth and scope of the disclosure should not be limited by the described exemplary embodiments, but only in accordance with the following claims and their equivalents.

What is claimed is:

1. A hook assembly, comprising:
    a body comprising a first surface, a second surface opposite to the first surface, and an peripheral surface connecting edges of the first surface and the second surface;
    a securing portion comprising an extending portion protruding from the first surface of the body and a hook portion perpendicularly extending from the extending portion and substantially parallel to the body;
    a hanging portion protruding out from the second surface of the body;
    a connection portion extending from the peripheral surface; and
    a pair of arc-shaped wings respectively extending from two opposite sides of the connection portion;
    wherein junction portions between the connection portion and the body and between the wings and the connection portion are cut, so that the connection portion and the pair of the wings are prone to be folded respectively along corresponding junction portions resulting in the connection portion with the pair of wings together defining a receiving space to receive the body and the securing portion.

2. The hook assembly as claimed in claim 1, wherein the pair of wings defines a plurality of recesses, and the peripheral surface of the body comprises a plurality of projections received in the recesses, respectively.

3. The hook assembly as claimed in claim 2, wherein each of the wings comprises a stopper portion located on one end of the wing adjacent to the body and perpendicularly connected to the wing.

4. The hook assembly as claimed in claim 1, wherein the hook assembly is made of plastic material.

5. A hook assembly comprising a body, a securing portion, a hanging portion, a connection portion and a pair of arc-shaped wings, the securing portion and the hanging portion respectively extending from two opposite sides of the body, the securing portion comprising a extending portion and a hook portion parallel with the body, the extending portion extending between the body and the hook portion, the connection portion parallel extending from the body, the pair of arc-shaped wings respectively extending from two opposite sides of the connection portion;
    wherein junction portions between the connection portion and the body and between the wings and the connection portion are cut, so that the connection portion and the pair of the wings are prone to be folded respectively along corresponding junction portions to enable the connection portion and the pair of wings to collectively define a receiving space to receive the body and the securing portion.

6. The hook assembly as claimed in claim 5, wherein the pair of wings defines a plurality of recesses, and the peripheral surface of the body comprises a plurality of projections received in the recesses, respectively.

7. The hook assembly as claimed in claim 6, wherein each of the wings comprises a stopper portion located on one end of the wing adjacent to the body and perpendicularly connected to the wing.

* * * * *